United States Patent Office 2,779,692
Patented Jan. 29, 1957

2,779,692

ALKALINE EARTH HYDROXIDE FRACTIONATION OF STARCH

Sidney M. Cantor, Overbrook Hills, Lower Merion Township, and Ernest L. Wimmer, Springfield, Pa., assignors to The American Sugar Refining Company, New York, N. Y., a corporation of New Jersey No Drawing. Application May 10, 1952,
Serial No. 287,262

11 Claims. (Cl. 127—71)

This invention relates to the fractionation of starch and more particularly to an improved process for the fractional separation of starches into their recognized major components, amylose and amylopectin, or into products enriched in such components.

Starch is a polysaccharide composed of anhydroglucose units which are joined together chiefly by 1,4-glucosidic bonds, although branching in amylopectin is recognized to proceed through 1,6-glucosidic bonds. Natural starches have been recognized to possess two major components, namely, amylose and amylopectin. These two components possess their own characteristic physical and chemical properties, and the properties of whole starch are essentially an average of the properties of its components modified by the organization of the components into granules. Thus, the amylose fraction of starch is responsible for gel formation, and retrogrades or insolubilizes upon standing, while the amylopectin does not set into gels but forms stable viscous hydrophilic solutions.

In many starch applications, the presence of one of the fractions may be detrimental to the action of the other. Thus, a pure amylopectin is of advantage where stability and protective colloid action is the desired function. High amylopectin starches are preferred for warp size because the amylose, after retrograding, weakens the starch film and renders the size difficult to remove. The amylose fraction, on the other hand, has fiber and film properties comparable to cellulose and forms rigid gels, in which the presence of amylopectin is disadvantageous.

The desirability of fractionating starch to separate the amylose from the amylopectin, or to produce fractions of high amylose content or high amylopectin content, has been recognized, and various processes have been proposed for this fractionation, but these processes have generally been unsatisfactory for commercial application or present problems of solvent recovery with resulting high cost of operation.

The present invention provides an improved process for starch fractionation which can be carried out in an economical manner without the use of inflammable or costly organic solvents or reagents and which enables the amylose, or a fraction of high amylose content and amylopectin or a fraction high in amylopectin content to be readily produced.

The present invention is based upon the discovery that the major components of starch, amylose and amylopectin, form alkaline earth hydroxide complexes, the stability and solubility of which in water differs considerably, and that this difference can be utilized in separating them from each other so as to produce substantially pure amylose or a fraction high in amylose and substantially pure amylopectin or a fraction high in amylopectin.

We have found that, when a starch dispersion is converted to the alkaline earth hydroxide complex, so as to effect quantitative precipitation of the starch as a mixture of the alkaline earth hydroxide-amylose complex and the alkaline earth hydroxide-amylopectin complex, and when this mixture is subjected to partial solution in aqueous media, it is the amylose fraction which dissolves or disperses preferentially, so that an enriched or pure amylose fraction may be eventually isolated from solution and similarly an enriched or pure amylopectin fraction may be isolated from the residue.

We have further found that a mixture of amylose and amylopectin can be treated to partially precipitate the mixture as the alkaline earth hydroxide complex and that it is the amylose fraction which is precipitated preferentially, giving an initial precipitate enriched in amylose and leaving a residual solution enriched in amylopectin.

The alkaline earth hydroxides used in the complete or fractional precipitation of the mixture of amylose and amylopectin as alkaline earth hydroxide complexes include calcium, barium and strontium hydroxides. Barium hydroxide may be used directly for the formation of the complex or complexes. Calcium hydroxide and strontium hydroxide for forming the complexes are advantageously formed *in situ* by first adding the required soluble alkaline earth salt such as the chloride, nitrate, acetate, etc., followed by the required amount of caustic alkali such as sodium hydroxide or potassium hydroxide; or by first adding the caustic alkali and then adding the soluble alkaline earth salt. Calcium hydroxide can also be added in a solubilized form such as the lime-sucrose solution. The formation and use of calcium hydroxide to form the calcium hydroxide complexes is particularly advantageous.

Where both the amylose and the amylopectin are to be precipicated, the amount of alkaline earth metal hydroxide formed or added should be sufficient for the complete precipitation. This amount can readily be determined by adding an apparent excess of an alkaline earth metal salt solution such as calcium chloride (1 mole per mole of anhydroglucose) and by gradually adding caustic soda in amount sufficient to effect complete precipitation; or by adding an excess of caustic soda and gradually adding the calcium chloride to effect complete precipitation, which can be readily determined by testing the solution from which the complexes are precipitated.

Where the starch is to be only partially precipitated, to separate the amylose or a fraction rich in amylose as the alkaline earth hydroxide complex, a similar procedure can be followed, but with the addition of a limited amount of alkali, where the calcium chloride is added first in excess, or by adding a limited amount of the calcium chloride solution, where the caustic soda is added first in excess; and, in either case, with gradual addition of the reagent to obtain only partial precipitation.

Where the starch is thus subjected to fractional precipitation, the amylose, or a fraction rich in amylose, is precipitated initially as the calcium hydroxide complex, leaving the amylopectin or a fraction rich in amylopectin, in solution. The precipitate is readily separated from the reaction mixture by centrifugation.

From the precipitated complex, the amylose or a fraction rich in amylose is readily isolated by dissolving the precipitate by first suspending it in water and then adding an acid such as carbonic, sulfurous, sulfuric or phosphoric acid, which forms an insoluble alkaline earth salt, leaving the amylose or a fraction rich in amylose in solution. After neutralization and filtration, the amylose is recovered from the filtrate by spray drying or by precipitation and recovery with a water miscible organic solvent such as ethanol, methanol, 2-propanol or acetone. Demineralization of the solution, e. g., by synthetic resin ion exchangers, may be accomplished before drying.

The amylopectin or the amylopectin enriched material which is contained in the centrifugate after the removal of the calcium hydroxide-amylose enriched precipitate, can readily be recovered from the solution by neutralizing with carbonic, sulfuric, sulfurous or phosphoric acid, followed by filtration, demineralization of the filtrate and spray drying, or by solvent precipitation, e. g., with methanol, ethanol, 2-propanol, or acetone.

Where the amylose and amylopectin are totally precipitated as the alkaline earth hydroxide complexes, the precipitate is separated from the liquor, e. g. by centrifugation, and can be dissolved in a fractional manner so as to produce a solution enriched in the amylose fraction of starch, while leaving a precipitate of the calcium hydroxide complex which is enriched in amylopectin.

We have found that there is such a significant difference between the stability and solubility of the alkaline earth complexes of amylose and amylopectin that the fractional solution and separation of the totally precipitated complexes can be accomplished by different methods of procedure. In one method of procedure, the alkaline earth hydroxide complexes are suspended in a small amount of water containing a predetermined amount of acid (such as hydrochloric acid, sulfuric acid, etc.) which will dissolve substantially all the amylose fraction and leave the amylopectin complex in the precipitate. In another method of procedure, the starch complexes are suspended in a considerably larger quantity of water, with the result that the alkaline earth hydroxide-amylose complex dissociates sufficiently so that the amylose is dissolved without the addition of acid. In another method of procedure, the alkaline earth complexes are suspended in a still larger quantity of water containing a regulated amount of dissolved alkali or lime, whereupon the amylose dissolves preferentially and the resulting amylose solution can then be separated from the remaining precipitated complex. Fractionation appears to be more sharply defined when a larger quantity of suspending medium is used, but this results in a more dilute solution of the amylose. After the amylose fraction has been separated from the admixed complexes in one or another of the alternative procedures above referred to, the remaining complex can be subjected to further treatment by one or the other of the above procedures to set free the amylopectin and to give an aqueous solution of amylopectin or one rich in amylopectin.

The solutions of amylose and of amylopectin, or the solutions rich in these respective components, can be further treated to separate the amylose or the amylopectin by a procedure similar to that above described in connection with the fractional precipitation procedure, e. g., by neutralizing with acid and precipitation with a water miscible solvent or by neutralization, demineralization and drying.

The present invention is applicable to various types of natural starches such as corn, potato, sorghum, wheat, rye, oat, tapioca, etc. It is essential that the starch mixture be well dispersed. This is assured by autoclaving or prolonged boiling of a gelatinized starch paste. It is advantageous, but not essential, that the starch be defatted, such as by ethanol extraction, before the fractionation treatment.

The solution of the dispersed starch should be a relatively dilute solution such as a solution containing from 2 to 5% of dispersed starch, as the use of too concentrated solutions complicates the fractional separation treatment.

The invention will be further described in connection with the following examples illustrating different methods of carrying out the fractionation process, but it will be understood that the invention is not limited thereto. In the examples, the starch used was cornstarch, which ordinarily contains around 20 to 25% amylose and 75 to 80% amylopectin.

In each of the following examples, the starch (cornstarch) was fractionated as described and the products were isolated by 2-propanol precipitation from solutions of the fractions, and the products were then dried in vacuo and analyzed for their amylose content by the iodine absorption method of Bates et al. (J. Am. Chem. Soc. 65, 142 (1943)).

Example 1 illustrates the process whereby the mixture of components is totally precipitated as the calcium hydroxide complexes and the precipitate is subjected to a fractional solution with acid whereby the amylose fraction is dissolved preferentially.

*Example 1*

A 2.5% cornstarch dispersion was prepared by adding a heavy aqueous slurry of defatted cornstarch to the requisite amount of boiling water and cooking at 15 pounds per square inch (125° C.) for 3 hours.

To 1,000 parts of this mixture, after cooling to 35° C., there was added 50 parts of 3 M calcium chloride solution corresponding to approximately 1 mole per mole of anhydroglucose. There was then gradually added with agitation a sufficient amount of 1 N sodium hydroxide solution to effect complete precipitation of the starch. This required approximately 68 parts of the solution. A heavy white precipitate of the calcium hydroxide complexes of the starch constituents was formed and was separated from the solution by centrifugation, and this precipitate was kept for 16 hours at 25° C. before further treatment. The precipitation of the complexes takes place under alkaline conditions at a pH around 12.5, and the holding of the alkaline complex precipitate for a period of time appears advantageous in giving an improved separation or fractionation of the components.

The precipitate, after holding for 16 hours, was suspended with vigorous mixing in 400 parts of water and 6 parts of 1 N hydrochloric acid was then added and mixed well for one-half hour. The solution was separated from the remaining slurry by centrifugation, giving a solution rich in amylose and leaving a complex in the slurry rich in amylopectin.

The supernatant amylose solution was then neutralized to pH 8.5 with carbon dioxide gas and recentrifuged to remove the precipitated calcium carbonate. A sample of the supernatant solution was then treated with an equivalent volume of 2-propanol, whereupon there was obtained a precipitate, which, after drying, was found to be essentially pure amylose in amount which, based on the total solution, represented 4.8 parts of dry product.

The entire amount of amylose can be separated from the solution in this way, i. e., by treating with 2-propanol and drying. The solution can also be demineralized, e. g., by the use of synthetic resin ion exchangers, and the solution then dried, e. g., by spray drying, to give the dry amylose product.

The residual precipitate, from which the amylose solution is separated, after the extraction of the amylose fraction with dilute acid, was resuspended in water and treated with 1 N hydrochloric acid to effect complete solution of the starch fraction. This required about 84 parts of the acid. The resulting solution of amylopectin was similarly treated to separate the amylopectin by adding an equivalent volume of 2-propanol whereupon a precipitate was obtained which, after drying, was found to be amylopectin almost devoid of amylose and which represented about 20 parts of amylopectin.

The amylopectin can also be separated from the solution by deionizing with a synthetic resin ion exchanger and the solution then dried, e. g., by spray drying, to give the dry amylopectin product.

In the above example, an excess of calcium chloride is used, that is, about 1 mole per mole of anhydroglucose units in the starch. But only part of this calcium chloride is required for reaction with the caustic soda to form the calcium hydroxide complexes. Much less calcium chloride can be used than in the above example, but there seems to be an advantage in using some excess of the calcium chloride over that which reacts with the caustic soda to effect complete precipitation of the starch as the calcium hydroxide complexes of the amylose and amylopectin.

In the above example, the precipitated complexes are held in a moist state for a considerable period of time after precipitation and before further treatment. This holding of the complexes under alkaline conditions appears to be advantageous in accomplishing a better separation of the amylose and amylopectin and in giving improved amylose and amylopectin products.

The following example illustrates another method of separating the amylose and amylopectin, or fractions rich in them, in which the mixture of starch components is totally precipitated as the calcium hydroxide complexes and the fractionation effected by suspension of the precipitate in a sufficient volume of water to dissociate the complexes sufficiently so that the amylose fraction of the starch dissolves or disperses and the calcium hydroxide-amylopectin complex is left in the residue.

*Example 2*

A cooked dispersion of cornstarch is prepared and the starch is completely precipitated as the calcium hydroxide-starch complexes, as in Example 1, and the precipitate is separated by centrifugation as in Example 1.

The precipitated complexes from 1000 parts of the dispersion are suspended with vigorous mixing in 300 parts of water and then there is slowly added an additional 240 parts of water with constant agitation. Approximately one-half hour is then allowed for equilibrium to be established, whereupon the slurrry is centrifuged. The supernatant solution is rich in amylose and is then treated as in Example 1 by neutralizing to a pH value around 8.5 with carbon dioxide gas and recentrifuged to remove precipitated calcium carbonate. This solution yielded about 9.2 parts of an amylose-enriched fraction, as determined by the 2-propanol precipitation method referred to in Example 1. This fraction can be obtained from the solution by precipitation with 2-propanol or other organic solvent or by deionizing the solution and drying to give the amylose-enriched fraction.

The residual amylopectin-rich precipitate, from which the supernatant solution has been separated, is treated as described in Example 1, by resuspending in water and treating with acid, and from the resulting solution, 12.9 parts of an amylopectin-enriched fraction was obtained by 2-propanol precipitation. Where the acid used for decomposing the complex is carbon dioxide or sulfuric acid or an acid which forms an insoluble calcium salt, which is removed from the solution by centrifuging, the solution can be deionized and dried to give the amylopectin-enriched fraction.

The following example illustrates another procedure for effecting fractionization of a mixture of complexes which are totally precipitated as the calcium hydroxide complexes, in which the precipitate is suspended in a lime water solution of regulated concentration and volume, so that the amylose is preferentially dissolved and the amylopectin is concentrated in the residual precipitate.

*Example 3*

A cooked dispersion of cornstarch is prepared and the starch is completely precipitated as the calcium hydroxide starch complexes, as in Example 1, and the precipitate is separated by centrifugation as in Example 1.

The precipitate from 1,000 parts of starch dispersion was then suspended with vigorous mixing in 1000 parts of lime water solution composed of one-third saturated lime water and two-thirds water. This results in a preferential dissolving of part of the amylose. The suspension was centrifuged to separate the amylose solution, and this supernatant solution was treated with carbon dioxide to a pH of 8.0 as in Example 1, recentrifuged to remove precipitated calcium carbonate, and the amylose then separated from the solution. Precipitation with 2-propanol gave 2.1 parts of substantially pure amylose. The amylose can also be separated from the solution by deionizing and drying.

The residual precipitate of calcium hydroxide complex remaining after the amylose extraction was treated, as described in Example 1, by resuspending in water and treating with acid to effect complete solution of the complex. Precipitation by 2-propanol gave 17.8 parts of substantially enriched amylopectin. This enriched amylopectin fraction can also be separated from the solution by deionizing and drying; and where it is to be so separated, the acid used for dissolving the amylopectin is advantageously an acid such as carbon dioxide or sulfuric acid, which forms an insoluble calcium salt which is removed by centrifuging before the deionizing and drying.

The following example illustrates a method of effecting fractional precipitation of the amylose-enriched fraction, while leaving in solution an amylopectin-enriched fraction. In this example, the caustic soda required for the total precipitation of the starch is added to a cooked starch dispersion and the components are fractionally precipitated by the addition of sufficient calcium chloride to precipitate an amylose-enriched fraction and leave in solution an amylopectin-enriched fraction.

*Example 4*

A cooked cornstarch dispersion was prepared as in Example 1. This dispersion was cooled with agitation to 30–35° C., and 100 parts of 1 N sodium hydroxide solution was added to 1000 parts of the starch dispersion. To this mixture, there was then added with vigorous agitation 42 parts of 1 M calcium chloride solution. A voluminous white precipitate was formed which was separated by centrifugation. This precipitate was dispersed in a small amount of water and treated with carbon dioxide to a pH value of 8.0. The precipitated calcium carbonate was removed by filtration and the filtrate, on treating with an equivalent volume of 2-propanol, gave 6.0 parts of a fraction substantially enriched in amylose content.

The starch component from this solution of the amylose-enriched fraction can also be separated by deionizing and drying.

The fractional precipitation of an amylose-rich fraction leaves a solution of an enriched amylopectin fraction. The amylopectin fraction can be separated from the solution by different methods of procedure. According to one method of procedure, this enriched ampylopectin fraction contained in the supernatant liquor from the centrifuge, was neutralized with hydrochloric acid and precipitated with 2-propanol to give 18.2 parts of an enriched amylopectin fraction.

Another method of treating the solution containing the enriched amylopectin fraction is to added a further amount of calcium chloride to effect substantially complete precipitation of the calcium hydroxide complexes, separating the precipitate by centrifuging, suspending the precipitate in water, and treating with an acid, as described in Example 1, advantageously an acid which will form an insoluble calcium salt. The amylopectin-enriched fraction can then be separated from the solution by precipitation with an organic solvent or by deionizing and drying.

The following example illustrates a further method of fractional precipitation, in which the mixture of amylose and amylopectin is fractionally precipitated as the calcium hydroxide complexes by adding calcium chloride sufficient for total precipitation initially and then adding a regulated amount of caustic soda solution sufficient to effect partial and incomplete precipitation, so as to yield a precipitate of calcium hydroxide-starch complex materially enriched in amylose and a residual solution containing starch materially enriched in amylopectin.

Example 5

A cooked cornstarch dispersion is prepared as in Example 1.

To 1000 parts of the cooled dispersion there is added 50 parts of 3 M calcium chloride solution and then, with vigorous agitation, 50.0 parts of 1 N sodium hydroxide solution is added. The starch is partially precipitated as the calcium hydroxide complexes, giving a fraction enriched in amylose content, while leaving in solution a fraction enriched in amylopectin.

The partial precipitate is isolated by centrifugation and treated as described in Example 4 for the recovery of a starch fraction enriched in amylose. By the 2-propanol precipitation treatment of the solution set free from the precipitate, there was obtained 12.0 parts of a fraction enriched in amylose.

The unprecipitated starch fraction remaining after the partial precipitation and separation of the precipitate can be treated to separate the amylopectin therefrom by different methods of procedure such as those described in Example 4. Direct treatment with carbon dioxide to neutralize and remove calcium as calcium carbonate, followed by centrifuging and precipitation with 2-propanol gave 12.9 parts of a starch fraction of essentially pure amylopectin.

The amylopectin can also be recovered from the solution by the addition of a further amount of normal caustic soda solution to effect complete precipitation in the form of the calcium hydroxide complex, which can then be treated with acid to separate the amylopectin therefrom as described in Example 1.

Examples 4 and 5 illustrate the fractionation process in which a selective and partial precipitation of the amylose or amylose-rich fraction is first produced, and from which the amylose, or fraction rich in amylose, is recovered, while leaving the amylopectin or a fraction rich in amylopectin in solution after the partial precipitation. This solution can be directly treated, without precipitation as the calcium hydroxide complex, to recover the amylopectin, or a fraction rich in amylopectin. The solution can also be treated with additional calcium hydroxide to convert the amylopectin fraction into an alkaline earth complex which is separated from the solution and further treated to recover the amylopectin or a fraction rich in amylopectin therefrom.

In the above examples, the fractional precipitation of the starch solution gives an alkaline earth complex precipitate of the amylose or one rich in amylose. And the further precipitation of the remaining starch fraction as the alkaline earth complex gives an amylopectin complex or a complex rich in amylopectin. So also, when the starch is completely precipitated as the alkaline earth hydroxide complexes, the fractionation of the precipitate by selectively dissolving the amylose or an amylose-rich fraction leaves a precipitate which is an alkaline earth-amylopectin comlex or a precipitate rich in such complex.

These alkaline earth complexes of amylose and of amylopectin, or complexes rich in amylose or amylopectin, are themselves valuable complexes which are useful for other purposes than for the direct treatment to recover the amylose and amylopectin therefrom. After washing, advantageously with lime water, the complex compounds may be dried and marketed as such or they may be used directly as sources of amylose or amylopectin in certain organic syntheses, especially those syntheses which take advantage of the strong alkalinity of the compounds, such as ether and ester formation.

The precipitated complexes are themselves alkaline in nature. They are produced by precipitation at a pH around 12.5. The action of the alkali used in forming the precipitates and the alkaline nature of the precipitates and of the admixed liquor appears to be advantageous in effecting a modification of the starch and starch components, particularly where the starch contains molecular aggregates or molecules associated through hydrogen bonds, where the effect of the alkali is a dissociating effect on the starch and apparently gives a dissociation and dispersion which promotes effective fractionation and gives separated fractions of improved solubility characteristics, depending upon the nature and extent of the alkaline treatment, particularly where the precipitate is aged for a period of time before the recovery of the amylose and amylopectin from the precipitated complexes.

While, in the above examples, only two fractions are separated, it will be evident that three or more fractions can be separated, particularly where it is desirable to obtain both an amylose fraction substantially free from amylopectin and an amylopectin fraction substantially free from amylose.

Also, the fractions which are first formed can be further fractionated. Thus an amylose fraction rich in amylose but still containing some amylopectin can be again subjected to fractionation to give a pure amylose fraction. And a fraction rich in amylopectin and still containing amylose can similarly be further fractionated to give a substantially pure amylopectin fraction.

Even without such further fractionation, it is possible to obtain essentially pure amylose or essentially pure amylopectin. An amylose fraction of high purity appears to be best isolated by partial solution of the totally precipitated complexes, while an essentially pure amylopectin fraction appears to be best obtained as the residual liquid phase from the partial precipitation of the starch dispersion.

Where the fractions obtained are not pure amylose and pure amylopectin but are fractions rich in these respective starch components, they may be further fractionated, or purified by other fractionating procedures such as precipitation by polar organic solvents or by further fractionation according to the present process.

It is, however, one advantage of the present invention that it enables starch to be fractionated into its major components, amylose and amylopectin, and into fractions rich in these components, in an economical manner, without the use of inflammable or costly organic solvents or reagents.

It will thus be seen that the present invention provides improved processes of fractionating starch into its major components, amylose and amylopectin, based on the difference in stability and solubility of the alkaline earth hydroxide complexes of these components. The invention includes improved processes of partial or fractional precipitation of a mixture of amylose and amylopectin as the alkaline earth hydroxide complexes, to obtain a solution enriched in amylopectin and a precipitate of alkaline earth hydroxide complexes enriched in amylose. The invention also includes improved processes of fractionating amylopectin and amylose in which the starch is completely precipitated as the alkaline earth hydroxide complexes which are partially or fractionally dissolved, so as to yield a solution enriched in amylose and a precipitate of alkaline earth hydroxide complexes enriched in amylopectin. The invention includes the essentially pure alkaline earth hydroxide-amylose complexes and the essentially pure alkaline earth hydroxide-amylopectin complexes as well as fractions rich in such respective complexes which are valuable intermediates which can be separated and dried and used for carrying out chemical reactions and forming derivatives of amylose and amylopectin as well as for treatment to separate the amylose and the amylopectin, or fractions rich in such components, therefrom.

We claim:

1. The method of effecting the fractional separation of amylose and amylopectin from starch containing them which comprises forming a dilute starch dispersion containing about 2% to 5% dispersed starch, reacting such solution with an alkaline earth hydroxide in amount sufficient to precipitate at least the amylose fraction as an insoluble alkaline earth hydroxide complex, suspending the precipitate in water and treating with an amount of an acid which forms an insoluble alkaline earth salt sufficient to react with the alkaline earth hydroxide of such complex and to give a solution of the amylose, and separating the amylose from such solution.

2. The method of effecting the fractional separation of amylose and amylopectin from starch containing them which comprises forming a dilute starch dispersion containing about 2% to 5% dispersed starch, reacting such solution with an alkaline earth hydroxide in amount sufficient to precipitate both the amylose and amylopectin fractions as insoluble alkaline earth hydroxide complexes, suspending the precipitate in water and treating with an amount of an acid which forms an insoluble alkaline earth salt sufficient to react with the alkaline earth hydroxide of the amylose complex and to give a solution of the amylose, and separating the amylose from such solution.

3. The method of effecting the fractional separation of amylose and amylopectin from starch containing them which comprises forming a dilute starch dispersion containing about 2% to 5% dispersed starch, reacting such solution with an alkaline earth hydroxide in amount sufficient to precipitate the amylose fraction as an insoluble alkaline earth hydroxide complex without precipitating the amylopectin fraction, suspending the precipitate in water and treating with an amount of an acid which forms an insoluble alkaline earth salt sufficient to react with the alkaline earth hydroxide of such complex and to give a solution of the amylose, and separating the amylose from such solution.

4. The process according to claim 3 in which the solution remaining after the precipitation of the alkaline earth hydroxide amylose complex, is treated to recover amylopectin therefrom by the addition of an amount of an acid which forms an insoluble alkaline earth salt sufficient to react with the alkaline earth hydroxide and to give a solution of the amylopectin, and separating the amylopectin from such solution.

5. The process according to claim 3 in which the solution remaining after the precipitation of the alkaline earth hydroxide amylose complex, is treated to recover amylopectin therefrom by reacting such solution with a further amount of alkaline earth hydroxide sufficient to precipitate the amylopectin fraction as an insoluble alkaline earth hydroxide complex, suspending the precipitate in water and treating with an amount of an acid which forms an insoluble alkaline earth salt sufficient to react with the alkaline earth hydroxide of the amylopectin complex and to give a solution of the amylopectin and separating the amylopectin from such solution.

6. The process according to claim 2 in which the precipitated alkaline earth hydroxide complexes of amylose and amylopectin are suspended in water and treated first with an amount of acid sufficient to convert the amylose into a soluble form while leaving the amylopectin in the form of an insoluble complex, the amylose solution is then separated from the precipitate and is further treated with an acid forming an insoluble alkaline earth salt before the separation of the amylose from the solution.

7. The process according to claim 2 in which the precipitated alkaline earth hydroxide complexes of amylose and amylopectin are suspended in an amount of water sufficient to convert the amylose into a soluble form, while leaving the amylopectin in the form of its insoluble alkaline earth hydroxide complex, and the amylose-containing solution is separated from the insoluble amylopectin complex before treatment with the acid forming an insoluble alkaline earth salt, followed by recovery of the amylose from the solution.

8. The process according to claim 2 in which the precipitated alkaline earth hydroxide complexes of amylose and amylopectin are suspended in an amount of dilute lime water sufficient to convert the amylose into a soluble form while leaving the amylopectin in the form of an insoluble alkaline earth hydroxide complex, with separation of the resulting solution from the insoluble complex followed by treatment of the solution with an acid forming an insoluble alkaline earth salt before the recovery of the amylopectin therefrom.

9. The process according to claim 2 in which the remaining amylopectin complex is suspended in water and treated with an amount of an acid forming an insoluble alkaline earth salt sufficient to combine with the alkaline earth hydroxide of the amylopectin complex, and separating the amylopectin from the resulting solution.

10. The process according to claim 1 in which the alkaline earth hydroxide is calcium hydroxide which is produced in situ by a reaction of a soluble calcium salt and caustic alkali.

11. The process according to claim 2 in which the alkaline earth hydroxide is calcium hydroxide which is produced in situ by a reaction of a soluble calcium salt and caustic alkali.

References Cited in the file of this patent

UNITED STATES PATENTS

| 578,566 | Kantorowicz | Mar. 9, 1897 |
| 984,483 | Kantorowicz | Feb. 14, 1911 |
| 2,515,095 | Schoch | July 11, 1950 |
| 2,515,096 | Schoch | July 11, 1950 |
| 2,609,370 | Gaver et al. | Sept. 2, 1952 |

FOREIGN PATENTS

| 272,274 | Great Britain | June 8, 1927 |
| 294,235 | Great Britain | June 27, 1929 |
| 415,092 | Germany | June 13, 1925 |

OTHER REFERENCES

Higginbotham et al.: "12—The Fractionation of Starch. Part II—The Separation of Amylose and Amylopectin," Journal Textile Institute, April 1949, pp. T208 to T219, 127–71.